United States Patent
Hibbs et al.

(10) Patent No.: US 6,756,695 B2
(45) Date of Patent: Jun. 29, 2004

(54) METHOD OF AND APPARATUS FOR WAVE ENERGY CONVERSION USING A FLOAT WITH EXCESS BUOYANCY

(75) Inventors: Bart D. Hibbs, Altadena, CA (US); Tyler MacCready, Pasadena, CA (US); Phillip T. Tokumaru, Moorpark, CA (US); Thomas Zambrano, Long Beach, CA (US)

(73) Assignee: AeroVironment Inc., Monrovia, CA (US)

( * ) Notice: Subject to any disclaimer, the term of this patent is extended or adjusted under 35 U.S.C. 154(b) by 117 days.

(21) Appl. No.: 09/928,038

(22) Filed: Aug. 9, 2001

(65) Prior Publication Data

US 2003/0193197 A1 Oct. 16, 2003

(51) Int. Cl.[7] .......................... F03B 13/10; F03B 13/00; H02P 9/04
(52) U.S. Cl. .............................. 290/42; 290/43; 290/53; 290/54
(58) Field of Search ........................... 415/277; 290/43, 290/42, 53, 54, 55

(56) References Cited

U.S. PATENT DOCUMENTS

| | | |
|---|---|---|
| 2,501,696 A | 3/1950 | Souczek |
| 3,209,156 A | 9/1965 | Struble, Jr. |
| 3,965,364 A | 6/1976 | Gustafson et al. |
| 4,045,148 A | 8/1977 | Morin |
| D261,639 S | 11/1981 | Robinson |
| 4,383,182 A | 5/1983 | Bowley |
| 4,533,292 A * | 8/1985 | Sugihara et al. .......... 415/211.1 |
| 4,748,808 A | 6/1988 | Hill |
| 4,850,190 A | 7/1989 | Pitts |

FOREIGN PATENT DOCUMENTS

| | | |
|---|---|---|
| AU | 728906 | 1/2001 |
| GB | 1595700 | 8/1981 |
| WO | WO 99/20896 | 4/1999 |
| WO | WO 01/48374 A2 | 7/2001 |

OTHER PUBLICATIONS

Matthais Tomczak, "Introduction to Physical Oceanography" (Ver. 2, Univ. of S. Australia, Adelaide, Septe. 2000).
Robert G. Dean and Robert A. Dalrymple, "Water Wave Mechanics for Engineer and Scientists", "Advanced Series on Ocean Engineering", vol. 2 (Prentice Hall, 1984).

* cited by examiner

Primary Examiner—Burton S. Mullins
Assistant Examiner—Julio C. Gonzalez
(74) Attorney, Agent, or Firm—Thomas I. Rozsa; Tony D. Chen (57) ABSTRACT

A method of and apparatus for generating electricity from ocean waves by utilizing a float with excessive buoyancy. The basic arrangement and principle utilizes a float with excess buoyancy which exerts a primarily upward buoyant force on the float along a direction perpendicular to the isobaric surfaces of the ocean waves which changes as the ocean waves propagating through the water body. A holding device is used to hold the float under the ocean surface, which exerts a primarily downward holding force on the float while allowing the float to move back and forth in a substantially horizontal direction as a result of a substantially horizontal force which is a combination of the holding force and the buoyant force. A turbine is attached to the float or the holding device for generating electricity as the float moves back and forth in the liquid body.

41 Claims, 8 Drawing Sheets

METHOD OF AND APPARATUS FOR WAVE ENERGY CONVERSION USING A FLOAT WITH EXCESS BUOYANCY

BACKGROUND OF THE INVENTION

1. Field of the Invention

The present invention relates generally relates to the technical field of energy generation and particularly to the field of energy generating devices for converting ocean wave energy to electrical energy.

2. Description of the Prior Art

Ocean waves are an attractive source of renewable energy. Ocean wave energy is abundant, more constant than wind and solar energy, well distributed around the globe and near much of the world's population. Nonetheless, little use has been made of ocean wave energy due to the difficulties in converting that energy into a useful form such as electricity.

Most conventional technologies relating to generating electricity from ocean waves focus on extracting ocean wave energy from the motion of the ocean waves as the ocean waves migrate through the energy generating device, either using moving flows or using wind turbines driven by air trapped in enclosures above the waves.

The following nine (9) references are believed to be pertinent to this field of art:

1. U.S. Pat. No. 2,501,696 issued to E. Souczek on Mar. 28, 1950 for "Stream Turbing" (hereafter the "Souczek patent");
2. U.S. Pat. No. 3,209,156 issued to A. D. Struble, Jr. on Sep. 28, 1965 for "Underwater Generator" (hereafter the "Struble patent");
3. U.S. Pat. No. 3,965,364 issued to Gustafson et al. on Jun. 22, 1976 for "Wave Generator" (hereafter the "Gustafson patent");
4. U.S. Pat. No. 4,045,148 issued to Morin on Aug. 30, 1977 for "Turbing" (hereafter the "Morin patent");
5. U.S. Pat. No. 4,383,182 issued to Bowley on May 10, 1983 for "Underwater Power Generator" (hereafter the "Bowley patent");
6. U.S. Pat. No. 4,748,808 issued to Hill on Jun. 7, 1988 for "Fluid Powered Motor-Generator Apparatus" (hereafter the "Hill patent");
7. U.S. Pat. No. 4,850,190 issued to Pitts on Jul. 25, 1989 for "Submerged Ocean Current Electrical Generator And Method For Hydrogen Production" (hereafter the "Pitts patent");
8. U.S. Design Pat. No. Des.261,639 issued to Robinson on Nov. 3, 1981 for "Water-Driven Electricity Generator" (hereafter the "Robinson Design Patent"); and
9. PCT Patent Publication No. WO 99/20896 published on Apr. 29, 1999 for "Method and Arrangement for Converting Kinetic Energy of Ocean Currents into Rotary Energy" (hereafter the "PCT Publication").

The Souczek patent disclosed a stream turbine device. The device includes a an underwater carrier wing structure connected to the stream turbine and adapted to create dynamic buoyancy. The underwater carrier wing structure is connected to one and of an elongated holding device. The other end of the holding device is anchored at the bottom of the water course.

The Struble patent disclosed an underwater generator unit. The unit includes a body portion having waterproofed stator elements mounted in the exterior surface of the body portion. The unit also includes a shaft for rotatively securing an impeller assembly.

The Gustafson patent disclosed a device for utilizing energy stored in wave motion. The device includes a buoyant body on the water surface is anchored so as to permit free, unrestricted vertical movement when acted upon by a heaving wave. An energy collecting device is connected to the buoyant body and located at a depth where the water is not subjected to the vertical wave motion.

The Morin patent disclosed a turbine with a water-driven motive element adapted for being immersed in a body of water. The motive element includes a disc having a density close to that of the water in which it is immersed. The disc is horizontally disposed and has a plurality of cells containing a mixture of liquid and gas and the disc carries on the upper and lower surfaces thereof a plurality of blades which are pivotably movable about a horizontal axis. Each blade has one or more pocket containing a mixture of gas and a liquid such that the density of the blades connected to the upper surface of the disc is less than that of water and the density of the blades connected to the lower surface of the disc is greater than that of water. The disc carries a structure which holds the blades in one direction of pivotal movement when the blades reach a vertical position. Under the action of water current, the blades are driven to their vertical position and effect rotation of the disc, which serves to drive an electrical generator system.

The Bowley patent disclosed an apparatus and method for generating electrical power. The apparatus includes a plurality of power producing modules disposed in a substantially constant velocity ocean current. The method includes the steps of mechanically coupling the output of the modules to drive a single electrical generator.

The Hill patent disclosed a fluid powered motor-generator apparatus. The apparatus includes a generator having a power output and a mechanically driven input. The generator has a generally streamlined motor body rotatably mounted to drive the generator input. The motor has a plurality of radially extending generally V-shaped fins mounted on an outside surface thereof. The fins are mounted on brackets above an outer surface of the motor body and have a convex pointed side facing in the direction of rotation and a concave open side facing in a direction opposite to the direction of rotation. As a result, the action of a stream of fluid on the fins tends to rotate the motor the motor body and drive the generator. If the motor-generator apparatus is mounted in water, the generator can be enclosed in another streamlined body which is anchored tot he bed of the body of water. A third streamlined motor body can be attached to the bottom of the generator body with a plurality of radially extending fins oriented to cause it to rotate opposite to the direction of rotation of the first streamlined motor body.

The Pitts patent disclosed a system and method for generating chemical energy from ocean current energy. The system includes a unique suspension system having a support cable submerged below the ocean surface in an isolation zone remote from the adverse influences of storms and hurricanes. The support cable is submerged by a first anchor which includes guys, buoyancy chambers and guy anchors. A second anchor is provided by generator cable assemblies which suspend a plurality of electric energy generating units and are anchored by means of suspension anchors. Buoyancy provided by modules exert a buoyancy on the suspension system and provides that the basic components of the suspension system essentially support their own weight. In this manner, little or no weight is exerted on support cable by the anchors and generating units suspended. In a preferred embodiment, the generating units are arranged in a matrix of vertical and horizontal rows across the width and along the depth of the ocean current.

The Robinson Design patent disclosed a water-driven electricity generator.

The PCT Publication disclosed a method and arrangement for converting kinetic energy of ocean currents into rotatory energy. The arrangement includes one or more turbines which is arranged to extend substantially vertically form a buoy anchored in such a way in an ocean current that it cannot rotate with the turbine and driving an electric generator or another rotary machine. At the bottom of the turbine, a counterweight is provided to retain the turbine substantially vertically at normal speed of the ocean current but to permit it to assume an inclined position when subjected to temporarily increased current speeds, thereby protecting the turbine form harmful flexural stresses and protecting the rotary machine from being overloaded.

While many of the above cited references have described systems and/or method for generating electric energy from ocean current, these conventional devices are mostly relying on generating electricity from the migration of the ocean waves and focusing on extracting ocean wave energy from the motion of the ocean waves as the ocean waves migrate through the energy generating device, by using either moving flows or using wind turbines driven by air trapped in enclosures above the waves.

In addition, the conventional energy generating devices are also limited in their efficiency by the difficulty in transforming high forces at low speeds into lower forces at higher speeds needed for electricity generation. Most of these conventional devices are further compromised by the necessity of operating at the ocean surface where they are exposed to storms and effected by tides. The installations of such conventional devices tend to be extremely large in comparison with the useful energy produced.

Therefore, it is desirable to provide a novel and unique device for generating electrical energy from ocean waves by utilizing migrating pressure fluctuations in ocean waves by utilizing an excessively buoyant float held beneath the water surface which is free to move horizontally within a limited range.

SUMMARY OF THE INVENTION

The present invention is directed to a method of and apparatus for generating electricity from ocean waves by utilizing a float with excessive buoyancy.

Most existing technology aims to extract wave energy from the motion of the liquid as waves migrate through it, either using moving floats or using wind turbines driven by air trapped in enclosures above the waves. Such devices are limited in their efficiency by the difficulty in transforming high forces at low speeds into the lower forces and higher speeds needed for electricity generation. Most of these devices are also compromised by the necessity of operating at the ocean surface where they are exposed to storms and effected by tides. As a general rule, the installations are extremely large in comparison with the useful energy produced.

The present invention is able to overcome many difficulties with existing concepts because it operates on a fundamentally different principle. Rather than being driven by the motion of the water in the waves, it is driven by the pressure fluctuations that travel waves.

In summary, the present invention is directed to a methodology of and an installation for extracting energy from a liquid in which pressure variations are present in the form of migrating surface waves and where it is possible to affix a device to a solid bottom or other structure that does not move vertically with the surface swell. Such an installation is particularly suitable for use in extracting energy from water at sea.

The basic embodiment of the present invention includes a float with excessive buoyancy tethered to the ocean floor. The tether keeps the float beneath the ocean surface in spite of the excessive buoyancy. It also allows the float to move horizontally in response to fluctuations in pressure in the region of the float. The pressure in the water is directly dependent on the depth beneath the surface. The buoyancy of the float creates a force perpendicular to the isobaric surfaces of the ocean wave. The float moves back and forth as the slope of the isobaric surfaces change which occurs as the ocean waves pass over the region where the float is moored. A turbine is held by and moves with the float for generating electricity.

In the present invention, the float with excessive buoyancy goes through the following phases or stages in a typical operation:

At the first stage, the float is directly above the mooring and the isobaric surface is sloping to the right. The float is forced to the right towards the wave trough because of the slope of the isobaric surfaces that mimic the wave shape.

In a second stage, the float is forced back to the left as the wave crest approaches because now the isobaric surfaces are sub-horizontal while the tether is pulling at an angle.

In the next stage, the float is once again directed above the mooring so the tether is not pulling horizontally but the wave crest has passed to the right so that the isobaric surface now slopes to the left. The resultant force vector is still directed to the left and the float continues to move in that direction.

At the last stage as the next trough passes over the float, the buoyancy vector again points vertically and the angle on the tether pulls the float to the right. The float now cycles back to the geometry of the initial stage.

The present invention has many important advantages, including its efficiency in energy conversion, its unobtrusiveness, its unaffectedness by ocean tides, its protection against storms, its omni-directionality, its ability to convert energy from both waves and currents, its scalability, and its simplicity.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a method of and a system for generating electricity from migrating pressure fluctuations in a fluid under the principle of excess buoyancy which is implemented by utilizing an excessively buoyant float held beneath the surface of the fluid and free to move horizontally within a limited range.

Figure 1:
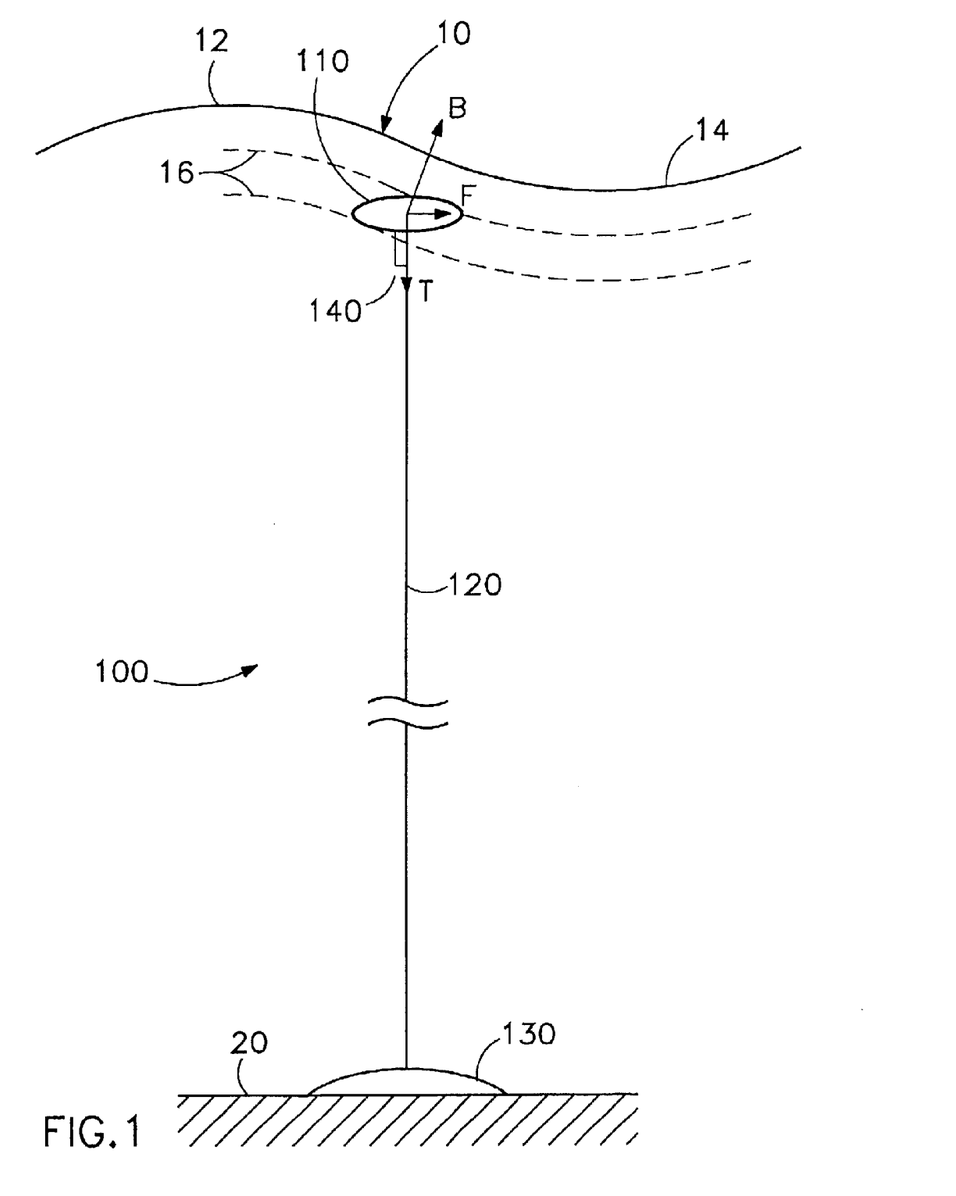
FIG. 1 is an illustrative diagram showing the basic structures and principles of the present invention method of and system for generating electricity from ocean waves by utilizing a float with excessive buoyancy which is tethered by an mooring on the ocean floor and supports a turbine for generating electricity.

Referring to FIG. 1, there is shown a basic arrangement of the present invention. In a preferred embodiment, the present invention wave energy conversion system 100 is installed beneath an ocean surface 10. The present invention wave energy conversion system 100 includes a float 110 with excessive buoyancy which is held by a tether 120 to the ocean floor 20. The tether 120 is moored by a mooring 130 and keeps the float 110 beneath the ocean surface 10 despite the excess buoyancy, and allows the float 110 to move horizontally in response to fluctuations in pressure in the region of the float 110.

The pressure in the water is directly dependent on the depth beneath the air/liquid interface, i.e., the ocean surface 10. Therefore, for example, the pressure at the same depth is the same regardless of whether it is in a wave crest 12 or trough 14, as depicted by the isobaric surfaces 16 (which is defined by hydrostatic pressure that corresponds with the depth of the water).

Buoyancy of the float 110 creates a force B which is perpendicular to the isobaric surfaces 16. The tether 120 also exert a force T on the float 110 along th downward direction of the tether 120. The resultant force F from the combined influence of the buoyancy force B and the tether force T fluctuates with the wave and tether geometries and drives the float 110 back and forth as the slope of the isobaric surfaces 16 change, which occurs as waves cross over the region where the system is moored.

The present invention wave energy conversion system 100 also include a turbine device 140 attached to the float 110 (or tether 120 ) for generating electricity as the float 110 moves through the water.

Referring to FIGS. 2A through 2D, which demonstrates the phases the present invention system 100 goes through in a typical operation.

Figure 2A:
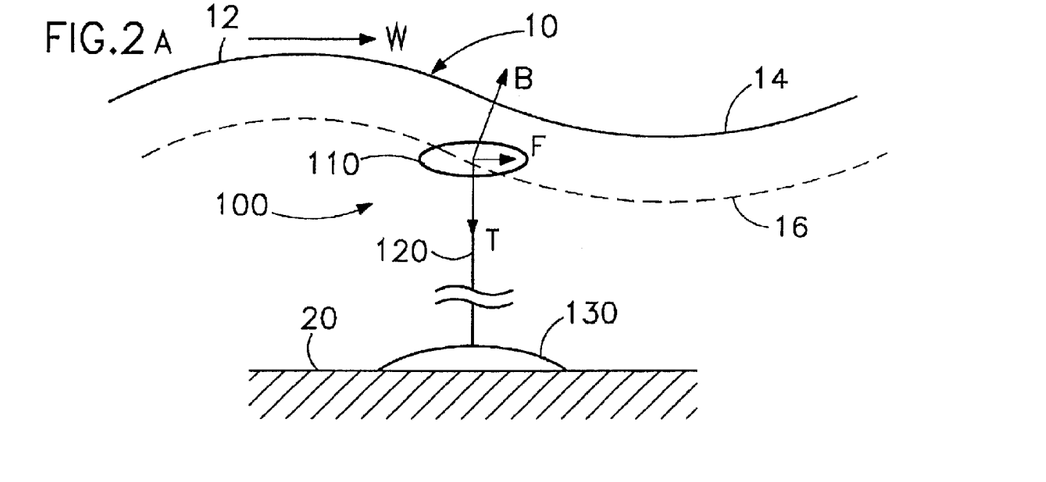
FIG. 2A is an illustrative diagram demonstrating the first phase which the present invention float with excessive buoyancy goes through in a typical operation.

At the first stage shown in FIG. 2A, the float 110 is directly above the mooring 130 and the water surface 10 is sloping to the right as shown by the wave propagation direction arrow W. The float 110 is forced to the right, towards the wave trough 14, because of the slope of the isobaric surfaces 16 that mimic the wave shape.

Figure 2B:
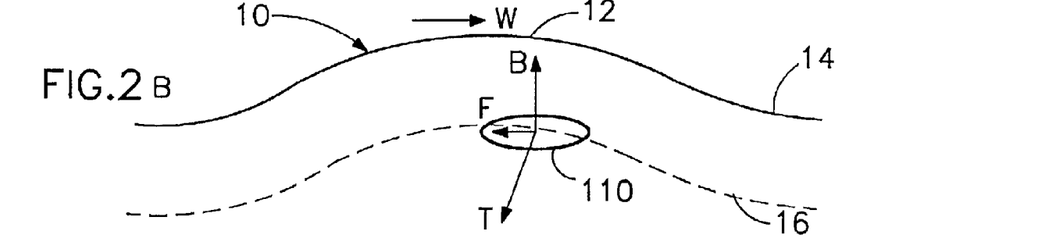
FIG. 2B is an illustrative diagram demonstrating the second phase which the present invention float with excessive buoyancy goes through in a typical operation.

At the second stage as shown in FIG. 2B, the float 110 is forced back to the left as the wave crest 12 approaches because now the isobaric surface 16 is sub-horizontal while the tether force T is pulling the float 110 at an angle.

Figure 2C:
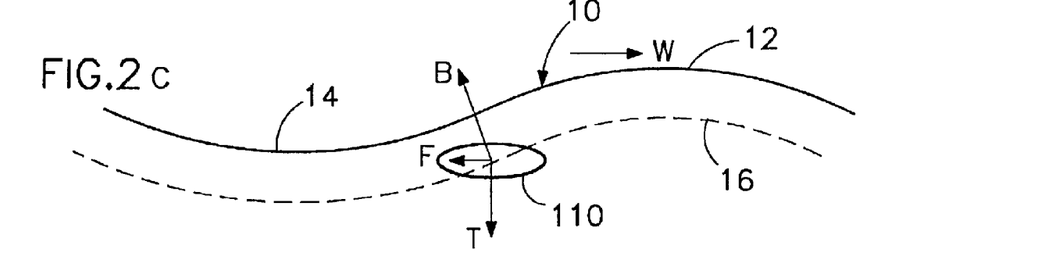
FIG. 2C is an illustrative diagram demonstrating the third phase which the present invention float with excessive buoyancy goes through in a typical operation.

At the thirds stage as shown in FIG. 2C, the float 110 is once again directly above the mooring 130 (not shown) so the tether force T is not pulling the float 110 vertically, but the wave crest 12 has passed to the right so the ocean surface 10 (as well as the isobaric surface 16) now slopes to the left. The resultant force F is still directed to the left and the float continues to move in that direction.

Figure 2D:
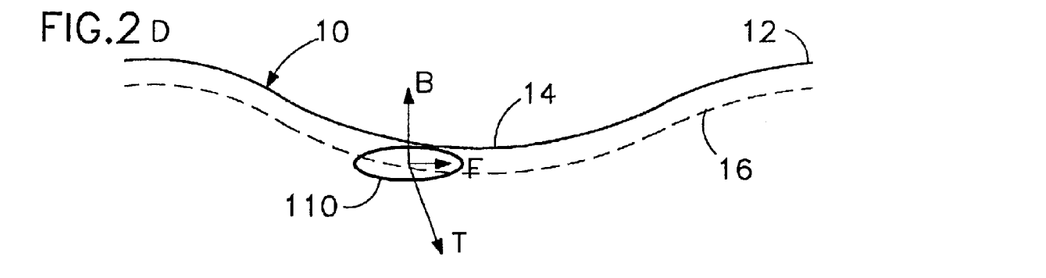
FIG. 2D is an illustrative diagram demonstrating the fourth and last phase which the present invention float with excessive buoyancy goes through in a typical operation.

At the fourth and last stage as shown in FIG. 2D, as the next trough 14 passes over the float 110, the buoyancy force B again points up vertically and the angle on the tether force T pulls the float 110 to the right. The float 110 now cycles back to the geometry of the first stage shown in FIG. 2A.

The potential to generate electric power or get other useful work from the present invention system 110 is afforded by the fact that the excessive buoyancy float 110 moves with respect to the fluid and/or with respect to the ground. Any mechanism that couples between the float and either of these other media will suffice. In the preferred embodiments of the present invention, the system 100 utilizes propellers on electric generators affixed to the float 110 or tether 120, as illustrated in FIGS. 3A through 3C.

Figures 3A, 3B, 3C:
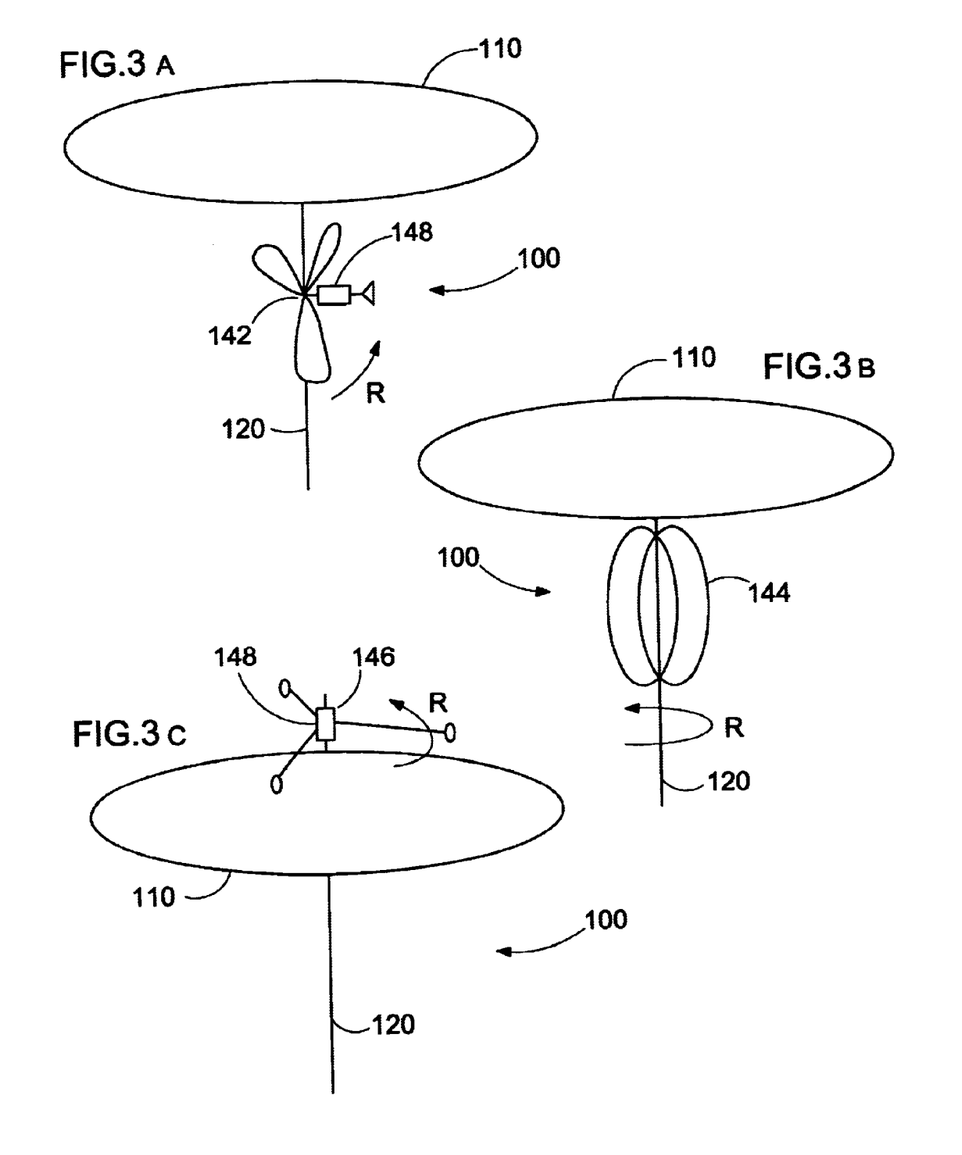
FIG. 3A is an illustrative diagram demonstrating a horizontal axis turbine utilized in the present invention system for generating electricity from ocean waves
FIG. 3B is an illustrative diagram showing a vertical axis turbine utilized in the present invention system for generating electricity from ocean waves
FIG. 3C is an illustrative diagram showing an alternative vertical axis turbine utilized in the present invention system for generating electricity from ocean waves.

The embodiment shown in FIG. 3A utilizes a horizontal axis turbine 142 and an electric generator 148 affixed to the tether 120 immediately beneath the float 110. The entire turbine 142 is free to rotate around a vertical axis so that it can adjust to the shifting directions of the float motion for driving the electric generator 148.

An alternative embodiment shown in FIG. 3B utilizes a vertical axis turbine 144 that is installed beneath the float 110. The vertical axis turbine 144 benefits from the fact that it needs no reorientation to adjust for changes in the float movement direction.

The embodiment shown in FIG. 3A utilizes a horizontal axis turbine 142 and an electric generator 148 affixed to the tether 120 immediately beneath the float 110. The entire turbine 142 is free to rotate around a vertical axis so that it can adjust to the shifting directions of the float motion for driving the electric generator 148.

In addition to these single turbine designs shown in FIGS. 3A through 3C, multiple turbines may also be attached to the float 110 or tether 120 in order to take advantage of the locations where the wave pressure fluctuations are accelerated around the float 110 or keep the size of individual turbines with a practical limit.

Figure 4A:
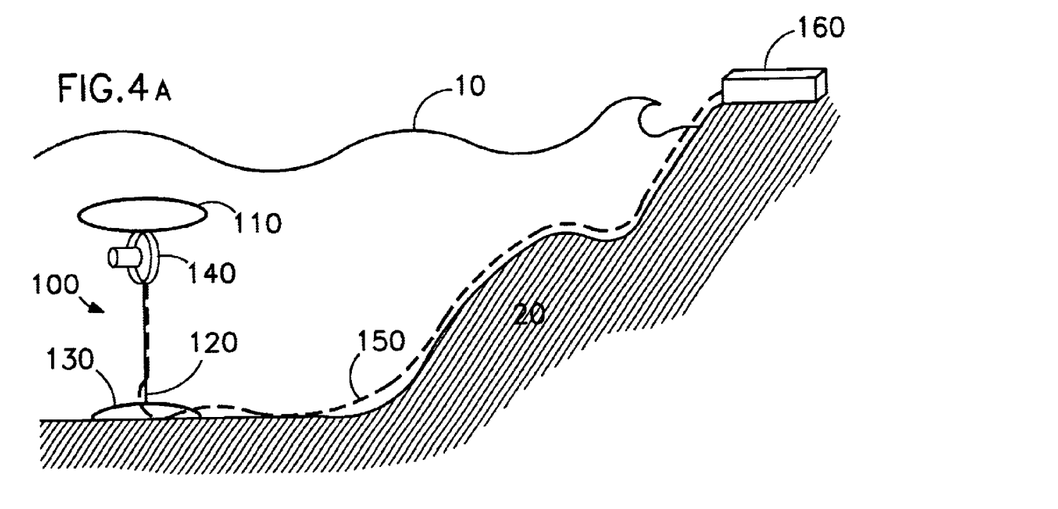
FIG. 4A is an illustrative diagram showing electrical cable connection between an offshore generator and an onshore power conditioning and storage installation.

Referring to FIG. 4A, electric power generated offshore by the generators in the present invention system 100 can be transported to shore through a conductive underwater cable 150 that follows the tether 120 to the ocean floor 20 and then extends along the ocean floor 20. The onshore facility 160 can condition the power to damp out fluctuations in the power supply. It can also contain batteries or capacitors for energy storage.

Figure 4B:
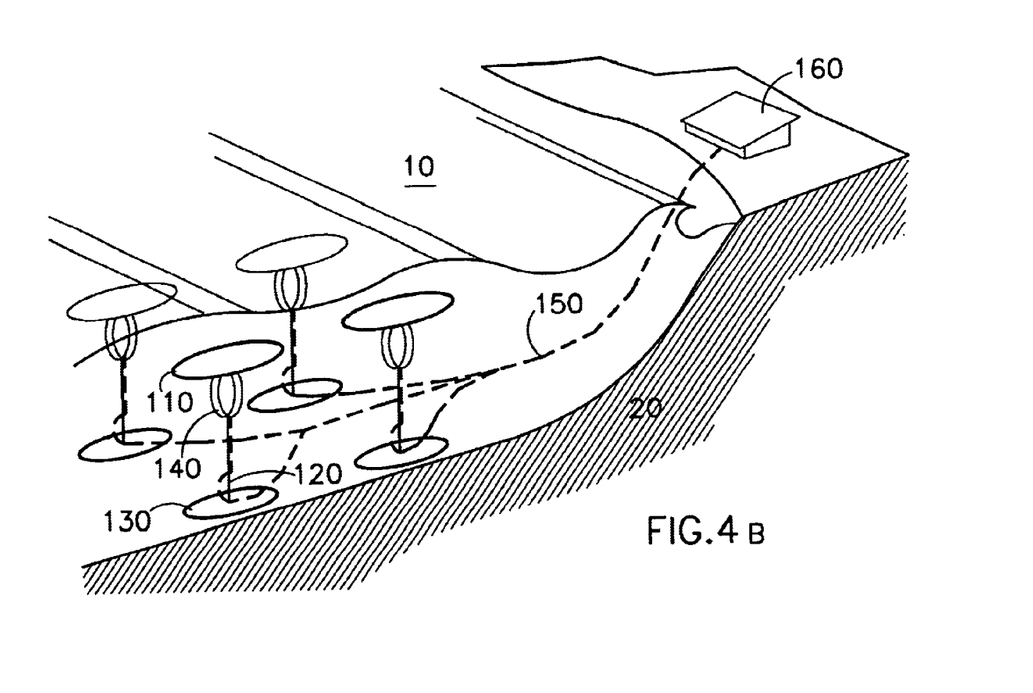
FIG. 4B is an illustrative diagram showing electrical cable connection between a group of offshore generators and the onshore power conditioning and storage installation.

Referring to FIG. 4B, there is illustrated an arrangement with multiple installations of the present invention system 100. There are situations where it would be preferable to use an array of the present invention system 100. For example, there may be a practice limit to the amount of power a single installation can generate depending on the factors such as the size of the wave pressure fluctuation, environmental concerns about the amount of wave disruption and the size of the vessel that install the system. In these situations multiple installations can be deployed to generate more power than a single installation. Also, multiple installations can be linked to generate more continuous energy. For a single installation the float motion is oscillatory and the power generated will fluctuate. One way to provide a more constant supply of electricity on land is to use multiple installations and place them different distances from shore so that they achieve peak power at different times. If two installations are separated by a distance equal to one half the wave length then one will be yielding peak power when the other is yielding minimum power, and vice versa.

The primary purpose of the present invention system 100 is to generate electricity or other useful work from the oscillatory motion induced by pressure variations associated with waves. However, if the electricity is generated using turbines that turn when the float moves through the water, then it will also be possible to get additional energy from any mass movement of the water with respect to the system. For example, when the system is affixed to the ocean floor it can benefit from the movement of water in currents, near river outlets or anywhere that the water is moving relative to the ocean floor.

A critical aspect of the functioning of the present invention system 100 is that the attachment to the ocean floor allows some degree of horizontal motion but restricts that motion when the horizontal excursion gets too large. The single tether mooring design shown in FIGS. 1 through 4B achieves these characteristics because it provides minimal resistance for small excursions while provides a strong restoring force for large excursions. However, it is not useful to place the single tether configuration in water that is too shallow because the tether will become overly restrictive on horizontal motion. Nonetheless, in many instances it would be desirable to have a energy generating system that would function effectively in shallow water settings. For example, there is power loss associated with the length of the electric cable that connects the system to the place where the energy is needed, so if the ocean depth increases very slowly away from the shoreline the power losses many be significant because the system would have to be so far away. In addition, it may also be favorable to operate the system in shallower water because shallower depths to the ocean floor increase the relative size of waves, decrease their wave length, and thus result in steeper pressure gradients.

Figure 5A:
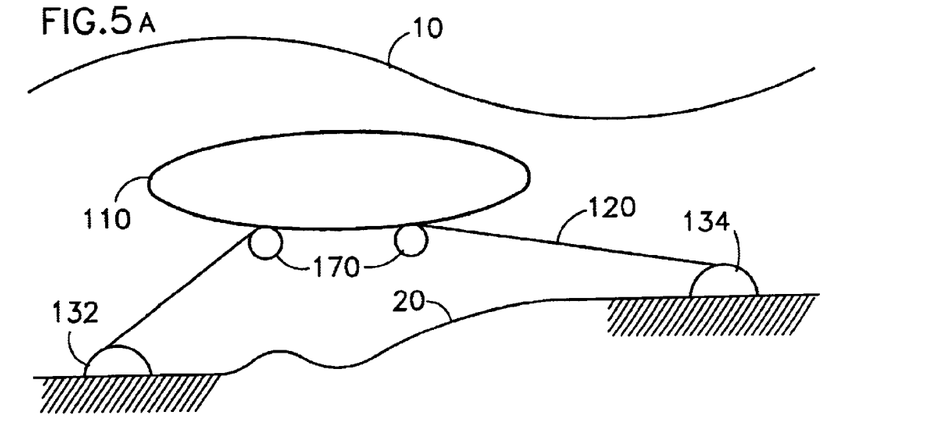
FIG. 5A is an illustrative diagram showing an embodiment of the present invention system for shallow water installation.
Figure 5B:
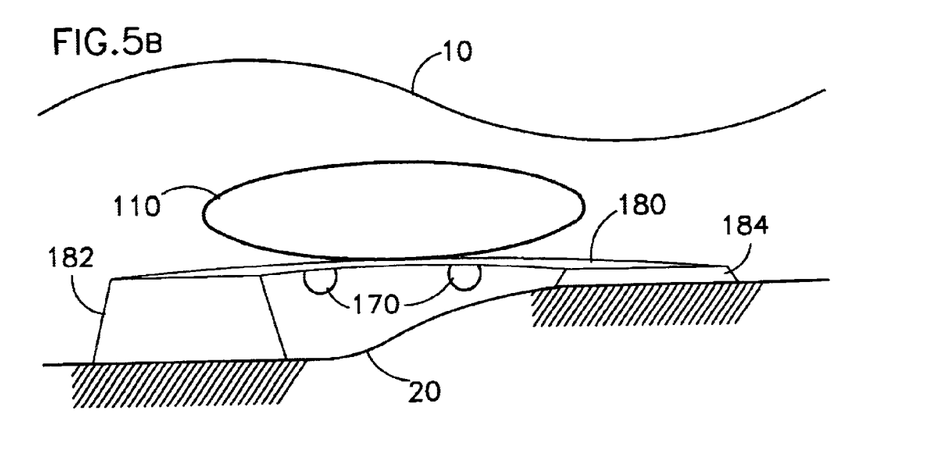
FIG. 5B is an illustrative diagram showing an alternative embodiment of the present invention system for shallow water installation.

Referring to FIGS. 5A and 5B, there are shown two alternative embodiments of the present invention system for shallower water. In the embodiment shown in FIG. 5A, the tether 120 is moored to the ocean floor 20 by moorings 132 and 134 at its two opposite ends. The float 110 is affixed to the tether 120 by one or more rollers 170 that allow the float 110 to oscillate horizontally. Because the float 110 moves with respect to the tether 120, it offers a new way of generating electricity by coupling to the rotation of the rollers 170. An additional option is to place fixed magnets (not shown) on either the float 110 or the tether 120 and use the other member as a linear generator.

In the embodiment shown in FIG. 5B, the shallow water installation utilizes a track 180 installed on or near the ocean floor 20 and supported at its two opposite ends by track anchors 182 and 184 to have the float 110 run on the track 180. The track 180 may be arched in its middle portion or curved at its ends to stop the float 110 at the end of its desired travel and to provide the restoring force that returns the float 110 towards the center of travel. Again, the motion of rollers 170 may be used to extract energy, or the linear generator option may be used.

Figure 6:
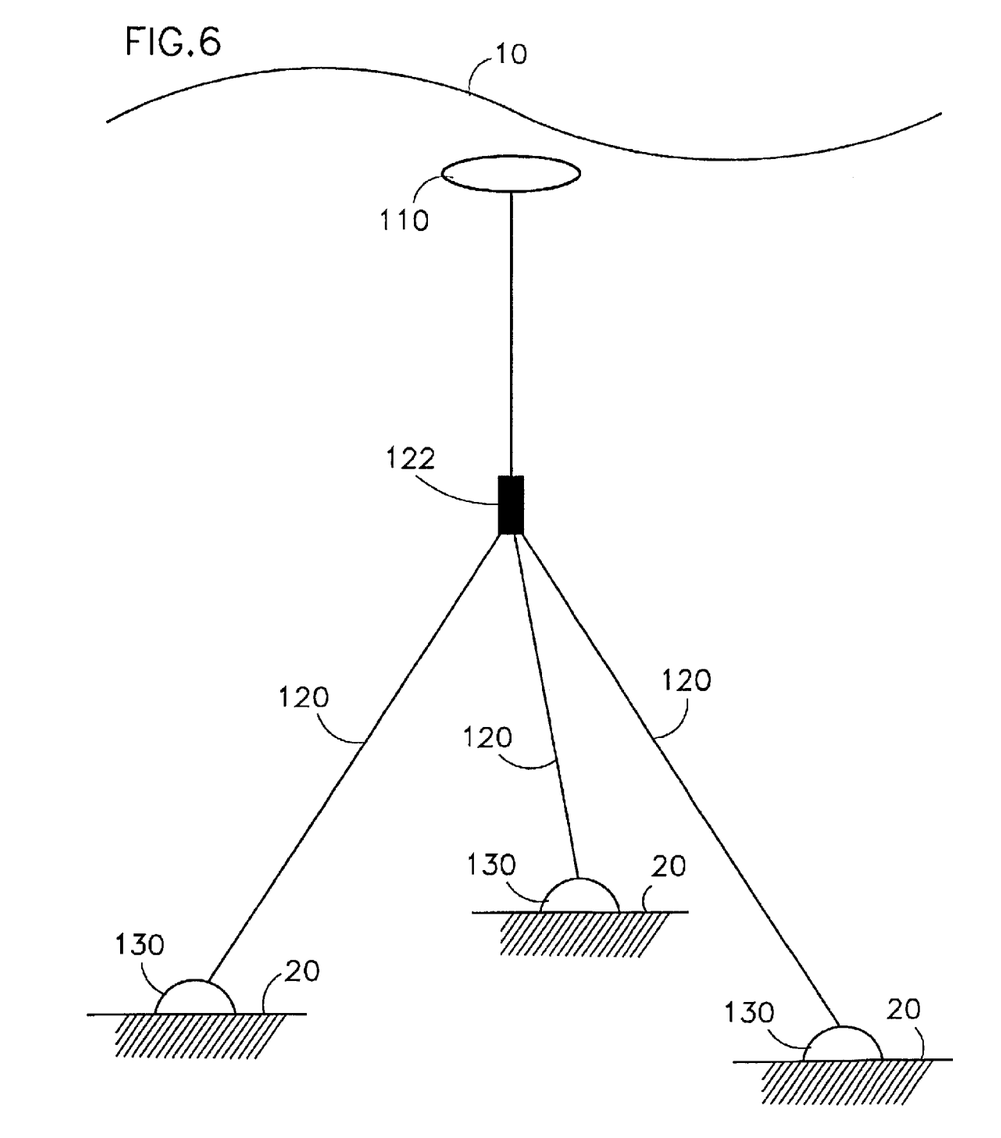
FIG. 6 is an illustrative diagram showing an embodiment of the present invention system where the float with excessive buoyancy is tethered by multiple moorings and tethers for deep water installation.
Figure 7:
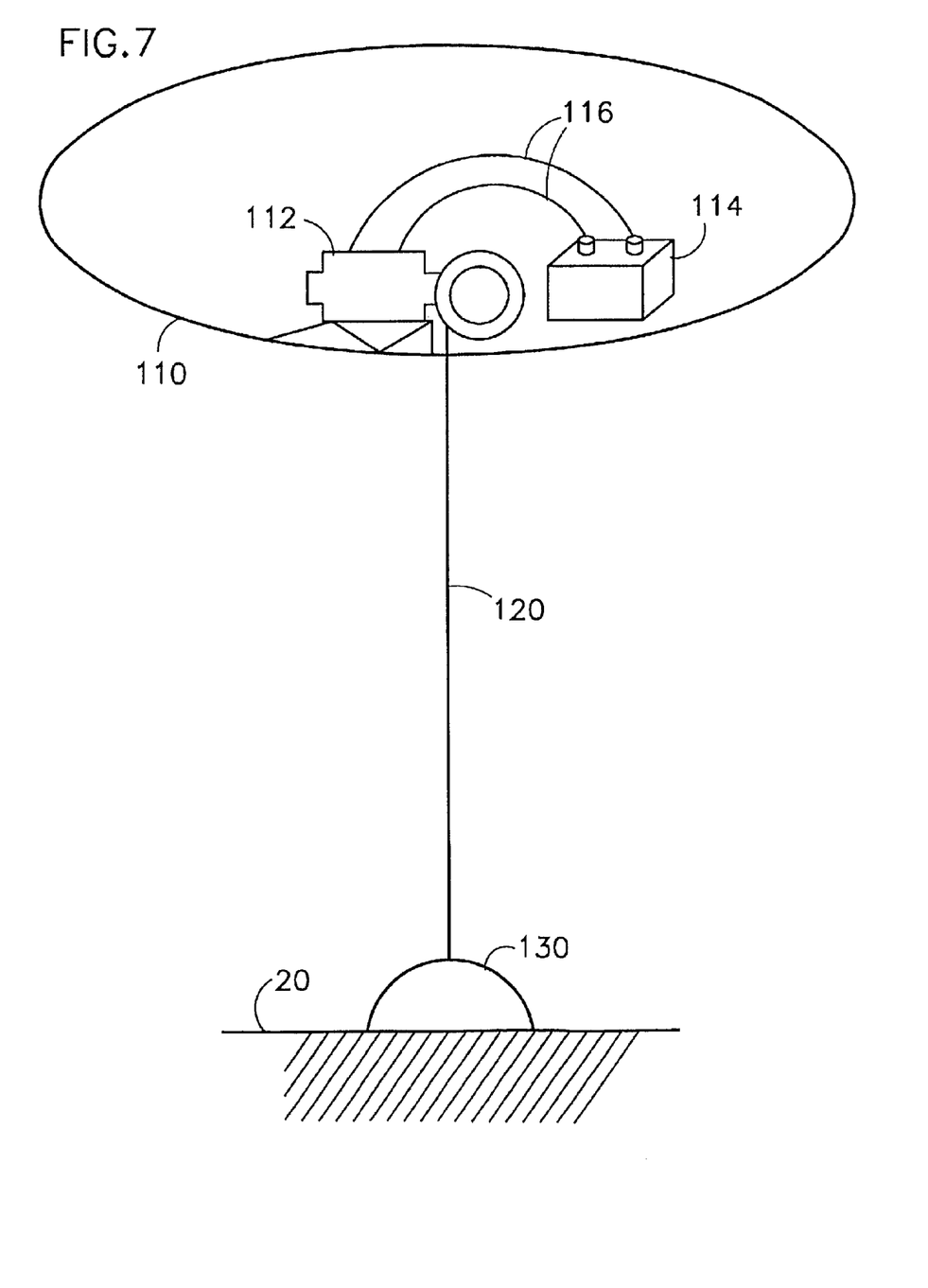
FIG. 7 is an illustrative diagram showing an alternative embodiment of the present invention system for deep water installation.

Referring to FIGS. 6 and 7, there are shown alternative embodiments of the present invention system for deeper water. There may be a problem with the single tether installation in water that is too deep because a single tether will not provide significant restoring force to the float.

As shown in FIG. 6, if a deep water installation is desired, it can be accomplished by having the tether branch out below a certain depth to connect to the ocean floor 20 in multiple mooring locations 130 so that the branching point will be held stationary despite the horizontal excursions of the float 110. This geometry also affords the opportunity to adjust the effective tether length by adjusting the depth as which the multiple tethers join into a combined tether. One mechanism that binds the tethers 120 together may be a moveable "collar" 122, which can be adjusted, by moving it up or down to change the distance between the float and the tether joining point, to "tune" the entire installation to an ideal geometry depending on changes in the ocean wave characteristics.

Adjusting the natural frequency of the apparatus has a large influence on power generation because when the installation achieves a natural resonance with the waves the excursions, speeds and forces will all increase. If the natural frequency can be adjusted in situ then there is a potential to keep the installation tuned for maximum power output as conditions change.

"Tuning" of the installation can also be achieved by other means besides moving the collar on the multi-tether installation. As an example shown in FIG. 7, tuning can be achieved by any suitable device, such as an electronic winch 112 powered by an on-board battery 114 through electrical cables 116, that can adjust the length of the tether 120 beneath the float 100.

Figure 8A:
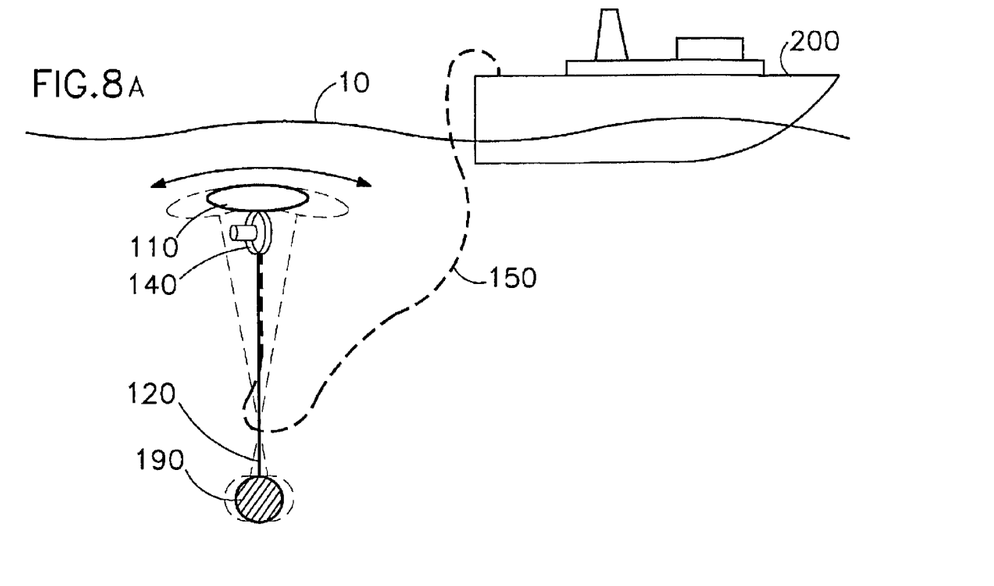
FIG. 8A is an illustrative diagram showing an embodiment of the present invention system for open ocean installation.
Figure 8B:
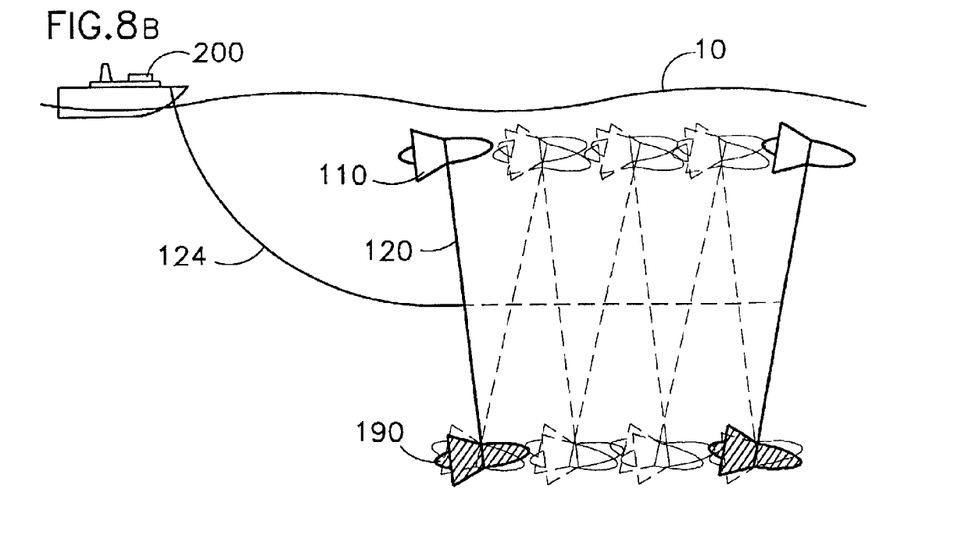
FIG. 8B is an illustrative diagram showing other applications of the principles of the present invention system utilizing a float with excessive buoyancy.

Of course the applications for the float-tether-counterweight configuration are not limited to power generation. Referring to FIG. 8B. if the float 110 and the counterweight 190 at the bottom of the tether 120 are designed with an asymmetric drag coefficient (i.e., the body has more drag when moving in one direction than moving in the reverse direction), then the entire device will oscillate and tend to migrate horizontally through the water. Hence such a device may be used to tow a vessel 200 using a structural cable 124. or used simply as a way to move the device to a desired location.

In some applications it may be desirable to extract wave energy far from shore or in extremely deep water. In these applications it may be impractical to moor the installation to the ocean floor. Nonetheless, the principle of the oscillating float can still be employed by using a counterbalance to act as a virtual mooring and offset the excess buoyancy of the float 110. Referring to FIG. 8A. there is shown an example of this modification. The counterweight 190 at the bottom of the tether 120 stays relatively stationary due to its inertia. An underwater cable 150 connects the turbine 140 to a receiving vessel 200. In addition, the counterweight 190 will be at a depth below most of the wave influence and therefore can be stabilized with added fins or some other drag producing device.

The present invention method and system have many advantages. The following are some of the more important advantages of the present invention:

1. Conversion Efficiency

Efficiency is always compromised when converting the slow-speed motion of the water to the high-speed movement needed in the generator that creates electricity. This device has a significant advantage over other devices because it moves horizontally through the water several times faster than the water itself moves within the waves.

2. Unobtrusive

The installation resides entirely beneath the ocean surface and thus has no impact on the aesthetics of the installation site. In addition, it operates silently which is preferable in comparison various surface installations that use air driven turbines.

3. Unaffected by Tides

Typical wave energy devices only function at the water/air interface and must be installed in a way that accounts for tidal fluctuations. In contrast, the pressure gradients that drive the present device extend several meters beneath the surface, so it can be placed a few meters below mean sea level, safely below the influence of tidal fluctuations.

4. Storm Protection

The subsurface placement also protects the installation from the most violent environmental extremes.

5. Omni-Directional

In some modes of installation there is no preferred directionality. Thus the device extracts energy regardless of the incident wave direction.

6. Ocean Current Energy

The device is unique among most ocean energy extraction devices in that the one device gathers energy from both waves and currents.

7. Scalable

The concept can easily be scaled to any output requirements limited only by the available wave energy. Alternatively, output can be increased by installing several devices that each contribute to the energy delivered to a single onshore station.

8. Simplicity

Single-tether mooring makes the device comparatively easy to install, and it does not require any additional structure such as a wave-focusing device.

Defined broadly, the present invention is an apparatus for extracting energy from waves in a liquid body, comprising: (a) at least one floating device placed in said liquid body and having a float with excess buoyancy exerting a primarily upward buoyant force on the float along a direction perpendicular to the isobaric surfaces of the liquid body which changes as said waves propagating through the liquid body; (b) the at least one floating device further having means for holding said float with excessive buoyancy in said liquid body, the holding means exerting a primarily downward holding force on said float while allowing said float to move back and forth in a substantially horizontal direction as a result of a substantially horizontal force which is a combination of the holding force and said buoyant force; and (c) means attached to said at least one floating device for generating electricity as said float moves back and forth in said liquid body.

Defined broadly, the present invention is a method of extracting energy from waves in a liquid body, comprising the steps of: (a) placing at least one floating device having a float with excess buoyancy in said liquid body such that the excess buoyancy exerts a primarily upward buoyant force on the float along a direction perpendicular to the isobaric surfaces of the liquid body which changes as said waves propagating through the water body; (b) holding said float with excessive buoyancy in said liquid body such that a primarily downward holding force is also exerted on said float, while allowing said float to move back and forth in a substantially horizontal direction, as a result of a substantially horizontal force which is a combination of the holding force and said buoyant force; and (c) attaching an electricity generating means to said at least one floating device for generating electricity as said float moves back and forth in said liquid body.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. An apparatus for extracting energy from waves in a liquid body, comprising:

a. at least one device placed in said liquid body and having a float with excess buoyancy exerting a primarily upward buoyant force on the float along a direction perpendicular to the isobaric surfaces of the liquid body which changes as said waves propagate through the liquid body;

b. the at least one device further having means for holding said float with excessive buoyancy in said liquid body beneath the surface of the liquid body, the holding means exerting a primarily downward holding force on said float while allowing said float to move back and forth in a substantially horizontal direction as a result of a substantially horizontal force which is a combination of the holding force and said buoyant force and changes the direction of said substantially horizontal force back and forth in response to fluctuating pressure in the region of said float that is associated with the waves of the liquid body; and c. means attached to said at least one device, including at least one propeller that is driven by said float due to said float moving back and forth in said substantially horizontal direction as a result of said substantially horizontal force and said propeller driving an electric generator, for generating electricity as said float moves back and forth in said liquid body.

2. The apparatus in accordance with claim 1, wherein said holding means comprises at least one elongated flexible tether.

3. The apparatus in accordance with claim 2, wherein said at least one tether is connected to said float at one end.

4. The apparatus in accordance with claim 3, wherein said holding means further comprises at least one mooring device connected to another end of said at least one tether.

5. The apparatus in accordance with claim 3, wherein said holding means further comprises at least one counter-weight device connected to another end of said at least one tether.

6. The apparatus in accordance with claim 2, wherein holding means further comprises a mechanism for interconnecting said float and said at least one tether that allows said float to move back and forth in a substantially horizontal direction.

7. The apparatus in accordance with claim 6, wherein said interconnecting mechanism comprises at least one roller pivotally connected to said float wherein said at least one roller is riding on said at least one tether.

8. The apparatus in accordance with claim 7, wherein said holding means further comprises at least one mooring device connected to each end of said at least one tether.

9. The apparatus in accordance with claim 1, wherein said holding means comprises at least one substantially horizontal track.

10. The apparatus in accordance with claim 9, wherein said holding means further comprises at least one anchoring device connected to each end of said at least one track.

11. The apparatus in accordance with claim 9, wherein holding means further comprises a mechanism for interconnecting said float and said at least one track that allows said float to move back and forth in a substantially horizontal direction.

12. The apparatus in accordance with claim 11, wherein said interconnecting mechanism comprises at least one roller pivotally connected to said float wherein said at least one roller is riding on said at least one track.

13. The apparatus in accordance with claim 2, further comprising means for adjusting the length of said at least one tether.

14. The apparatus in accordance with claim 13, wherein said adjusting means comprises a winch attached to said float.

15. The apparatus in accordance with claim 13, wherein said winch is an electric winch.

16. The apparatus in accordance with claim 1, wherein said holding means comprises a multiplicity of elongated flexible tethers.

17. The apparatus in accordance with claim 16, wherein said holding means further comprises at least one mooring device connected to each one of said multiplicity of tethers.

18. The apparatus in accordance with claim 16, further comprising means for joining said multiplicity of tethers at a distance below said float.

19. The apparatus in accordance with claim 18, wherein said joining means comprises at least one movable collar device.

20. The apparatus in accordance with claim 18, further comprising means for adjusting said distance below said float.

21. The apparatus in accordance with claim 20, wherein said adjusting means comprises at least one powered collar device.

22. The apparatus in accordance with claim 1, wherein said means for generating electricity is attached to said float.

23. The apparatus in accordance with claim 2, wherein said means for generating electricity is attached to said at least one tether at a location adjacent to said float.

24. The apparatus in accordance with claim 1, wherein said means for generating electricity comprises at least one turbine device.

25. The apparatus in accordance with claim 24, wherein said at least one turbine device is a horizontal axis turbine device.

26. The apparatus in accordance with claim 24, wherein said at least one turbine device is a vertical axis turbine device.

27. The apparatus in accordance with claim 1, further comprising means for transporting electricity generated by said electricity generating means to a power processing facility.

28. The apparatus in accordance with claim 1, wherein said electricity transporting means comprises at least one electrically conductive cable device.

29. A method of extracting energy from waves in a liquid body, comprising the steps of:
  a. placing at least one device having a float with excess buoyancy in said liquid body such that the excess buoyancy exerts a primarily upward buoyant force on the float along a direction perpendicular to the isobaric surfaces of the liquid body which changes as said waves propagate through the liquid body;
  b. holding said float with excessive buoyancy in said liquid body beneath the surface of the liquid body such that a primarily downward holding force is also exerted on said float, while allowing said float to move back and forth in a substantially horizontal direction, as a result of a substantially horizontal force which is a combination of the holding force and said buoyant force and changes the direction of said substantially horizontal force back and forth in response to fluctuating pressure in the region of said float that is associated with the waves of the liquid body; and c. attaching an electricity generating means to said at least one device; including at least one propeller that is driven by said float due to said float moving back and forth in said substantially horizontal direction as a result of said substantially horizontal force and said propeller driving an electric generator, for generating electricity as said float moves back and forth in said liquid body.

30. The method in accordance with claim 29, wherein said holding step further comprises a step of attaching at least one elongated flexible tether to said float.

31. The method in accordance with claim 30, wherein said holding step further comprises a step of mooring said at least one elongated flexible tether attached to said float.

32. The method in accordance with claim 30, wherein said holding step further comprises a step of attaching a counter-weight to said at least one elongated flexible tether.

33. The method in accordance with claim 30, wherein holding step further comprises a step of interconnecting said float and said at least one tether that allows said float to move back and forth in a substantially horizontal direction.

34. The apparatus in accordance with claim 29, wherein said holding step further comprises a step of supporting said float with at least one substantially horizontal track that allows said float to move back and forth in a substantially horizontal direction.

35. The method in accordance with claim 30, further comprising a step of adjusting the length of said at least one tether.

36. The method in accordance with claim 29, wherein said holding step further comprises a step of attaching a multiplicity of elongated flexible tethers to said float.

37. The method in accordance with claim 36, wherein said holding step further comprises the step of mooring each one of said multiplicity of tethers.

38. The method in accordance with claim 36, further comprising a step of joining said multiplicity of tethers at a distance below said float.

39. The method in accordance with claim 38, further comprising a step of adjusting said distance below said float.

40. The method in accordance with claim 29, further comprising a step of providing a power processing facility for conditioning and storage of electricity generated by said electricity generating means.

41. The method in accordance with claim 40, further comprising a step of transporting electricity generated by said electricity generating means to said power processing facility.

* * * * *